J. H. EYRSE.
Liquid-Measures.

No. 151,372. Patented May 26, 1874.

Witnesses
James Thurlow
Clarence Thurlow

John H. Eyrse
by E. Thurlow
his atty in fact

UNITED STATES PATENT OFFICE.

JOHN H. EYRSE, OF PEKIN, ILLINOIS, ASSIGNOR OF ONE-HALF HIS RIGHT TO AUGUST CARSTENS, OF SAME PLACE.

IMPROVEMENT IN LIQUID-MEASURES.

Specification forming part of Letters Patent No. 151,372, dated May 26, 1874; application filed January 14, 1874.

*To all whom it may concern:*

Be it known that I, JOHN H. EYRSE, of the city of Pekin, in the county of Tazewell and in the State of Illinois, have invented an Improvement in Liquid-Measures; and do hereby declare that the following is a full, clear, and exact description thereof, reference being had to the annexed drawings, making a part of this specification, in which like letters of reference refer to like parts, and in which—

Figure 1:
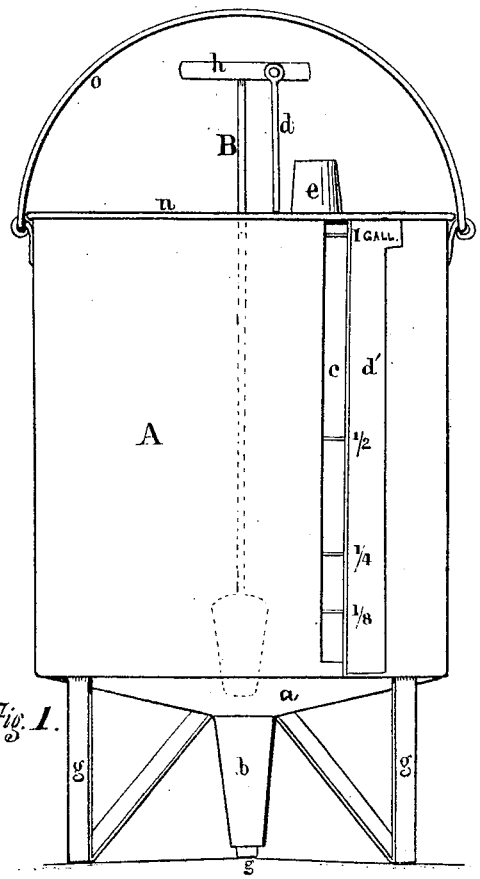
Figure 2:
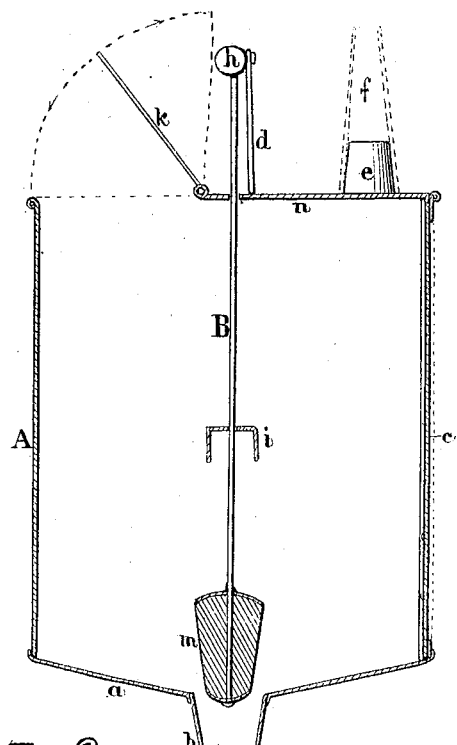
Figure 3:
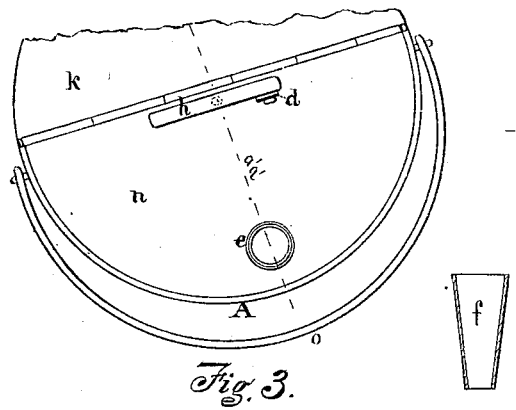
Figure 4:
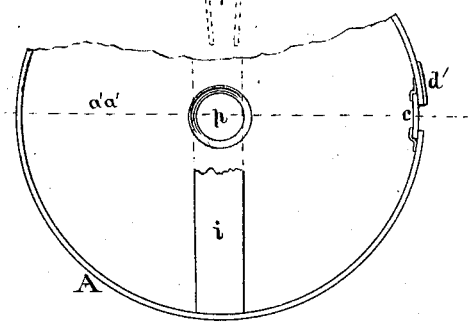

Figure 1 represents an elevation; Fig. 2, a vertical section (through Figs. 3 and 4) along dotted lines $a'$ $a'$ $a'$ $a'$; Fig. 3, a plan or superficial view; Fig. 4, a horizontal section above the brace $i$, Fig. 2.

This measure is a vessel designed to measure any fractional part or the whole of a gallon, quart, or other measure therein contained in a liquid form, and to discharge the same liquid from the bottom of the measure through a funnel-shaped bottom on unstopping the latter.

To indicate the quantity of liquid to be measured, a glass strip is inserted before a vertical opening in the side of the vessel, and is provided with an accompanying gage marked with the fractions and whole quantities of legal liquid-measures.

As the funnel-shaped bottom of the vessel would prevent its maintaining an erect position, three or more legs are provided at the bottom, and a handle is attached to the stopper of the funnel for the convenience of withdrawing it when it is desired to let out the contents, and a short wire depending from the same above the cover prevents the stopper from passing again into the funnel-pipe.

I will proceed to describe one of the modes in which I construct this measure.

In the drawings, A represents a cylindrical vessel, having a funnel-shaped bottom, $a$, with a large nozzle or duct, $b$, of a tapering form, to which may be attached a smaller nozzle, $f$, for filling (from the measure) smaller vessels, or vessels with small mouths. Around the edge of this funnel-shaped bottom $a$ are attached several legs $g$ $g$, &c., to keep the measure in a vertical position. To ascertain the amount of the contained liquid, a transparent medium (as glass) is inserted in a vertical slit or opening in the body of the vessel; this glass $c$ may be cemented within grooves on either side of the opening to make the vessel tight or impervious at this place to liquids, and an accompanying gage, $d'$, bearing fractions or marks, indicating the amount of contained liquid, or the required quantity to be measured.

The vessel is provided with a cover, $n$, part of which can be raised in the form of a trap, $k$, by which liquid is run into the measure. A nipple, $e$, may be soldered to the surface of the cover $n$, to retain the extra nozzle or tube $f$ when not in use. B represents the rod which passes upward from the stopper $m$, which closes the throat of the funnel; and, hence, through a brace, $i$, running across the interior of the vessel, whence the rod projects through a hole in the cover $n$, and terminates in a cross-handle, $h$, from one end of which depends a short wire, $d$, designed to sustain the stopper while the liquid is run off. A bail or handle, $o$, to the whole vessel is attached to the upper edge near the cover $n$.

The operation of this measure needs little description.

Liquids are received through the trap $k$, the stopper $m$ being then in the throat of the funnel-opening $p$. The quantities of liquid received are easily ascertained by reference to the glass opening $c$ and the gage $d'$. Having received the desired quantity of liquid, (as cider, brandy, wine, vinegar, molasses, &c.,) the tube of the funnel $a$ $b$ is inserted into the receiving-vessel, which latter, if it has a small mouth, can be filled from the measure after attaching (by slipping upon its tube) the extra tube $f$, which tube $f$, when not in use, is inverted upon the nipple $e$ on the cover $n$. The stopper $m$ is raised and held by the wire $d$, hanging from the handle $h$, and resting for this purpose upon the cover $n$.

The advantages of this invention are many, a few of which are as follows: First, it obviates the expense and incumbrance of several fractional measures; second, liquids can be drawn off from it without spilling or tilting it into small-necked vessels without a funnel, by merely raising the stopper, &c.

What I claim as my invention is—

In a liquid-measure having a gage on the side for measuring out the liquid, the stem B of stopper m, having a handle, h, provided with a pivotal support, d, substantially as and for the purposes set forth.

In testimony that I claim the foregoing liquid-measure I have hereunto set my hand this 6th day of January, 1874.

JOHN H. EYRSE.

Witnesses:
JOHN B. SMITH,
H. W. WELLS.